(12) United States Patent
Hsieh

(10) Patent No.: US 6,592,307 B2
(45) Date of Patent: Jul. 15, 2003

(54) PLANING DEVICE FOR REMOVING WELD BEADS ON CAR SHEET METAL

(76) Inventor: Yu-Fu Hsieh, P.O. Box 96-405, Taipei 106 (TW)

( * ) Notice: Subject to any disclaimer, the term of this patent is extended or adjusted under 35 U.S.C. 154(b) by 0 days.

(21) Appl. No.: 09/894,576

(22) Filed: Jun. 27, 2001

(65) Prior Publication Data

US 2003/0002946 A1 Jan. 2, 2003

(51) Int. Cl.$^7$ ................................................ B23C 1/20
(52) U.S. Cl. .................... 409/139; 409/181; 409/206; 451/358
(58) Field of Search ................................ 409/180, 181, 409/206, 218, 138, 139, 178, 140; 451/358; 144/136.95, 154.5

(56) References Cited

U.S. PATENT DOCUMENTS

| | | | | |
|---|---|---|---|---|
| 1,023,406 A | * | 4/1912 | Ackerman | 15/23 |
| 1,775,430 A | * | 9/1930 | Hibbs | 144/117.4 |
| 2,069,700 A | * | 2/1937 | Emmons | 15/23 |
| 2,393,463 A | * | 1/1946 | Gottlieb | 144/114.1 |
| 2,578,371 A | * | 12/1951 | Plester | 313/260 |
| 2,625,860 A | * | 1/1953 | Plester | 409/181 |
| 2,987,970 A | * | 6/1961 | Watson | 144/117.4 |
| 3,044,366 A | * | 7/1962 | Bidart | 125/11.03 |
| 3,421,411 A | * | 1/1969 | Lowry et al. | 409/143 |
| 4,041,997 A | * | 8/1977 | Selfe | 144/136.95 |
| 4,948,307 A | * | 8/1990 | Dodds | 409/136 |
| 6,213,694 B1 | * | 4/2001 | Ichikawa | 409/139 |

* cited by examiner

Primary Examiner—Daniel W. Howell
(74) Attorney, Agent, or Firm—Troxell Law Office PLLC

(57) ABSTRACT

A planing device for removing weld beads on car sheet metal, which comprises a handle, a cylinder cover and a support frame; the front end of the support frame is mounted with a round milling cutter; the inner side of the round milling cutter is furnished with a guide frame for adjusting the height between the bottom surface of the guide frame and the surface a sheet metal; when the round milling cutter is rotated at a high speed, the weld beads on a car sheet metal will be planed off.

9 Claims, 7 Drawing Sheets

PLANING DEVICE FOR REMOVING WELD BEADS ON CAR SHEET METAL

BACKGROUND OF THE INVENTION

1. Field of the Invention

This invention relates to a car sheet-metal working tool, and particularly to a planing device for removing weld beads on car sheet metal.

2. Description of the Prior Art

In the conventional welding work for sheet metal, a series of weld beads will be left on a weld line, and such weld beads are usually removed with a grinding wheel. When a manual grinding wheel is used for removing the weld beads, the grinding operation can be done easily and smoothly; however, since the space between the grinding wheel and the weld beads can not be controlled properly, the sheet metal is subject to being ground, and then a scratch or a recess scar can be resulted on the sheet metal; if the scar is small, it can be polished off; if the scar is a deep one, a further repair is necessary.

SUMMARY OF THE INVENTION

The prime object of the present invention is to plane off all weld beads on car sheet metal by using a round milling cutter directly.

Another object of the present invention is to provide a round milling cutter, of which the inner side has a guide frame for adjusting height; the guide frame has symmetrical claws extended under both sides of the round milling cutter; the bottom surface of the claws is in contact with the surface of sheet metal; the space between the round milling cutter and the sheet metal can be adjusted so as to control the height thereof properly upon planing the weld beads without over-cutting.

Still another object of the present invention is to provide not only planing operation to weld beads, but also planing operation to pivot beads of car sheet metal.

A further object of the present invention is to provide a round milling cutter to plane off weld beads; the present invention also comprises a grinding wheel and a polishing wheel so as to provide a polishing operation after planing operation.

DETAILED DESCRIPTION OF THE PREFERRED EMBODIMENT

Figure 1:
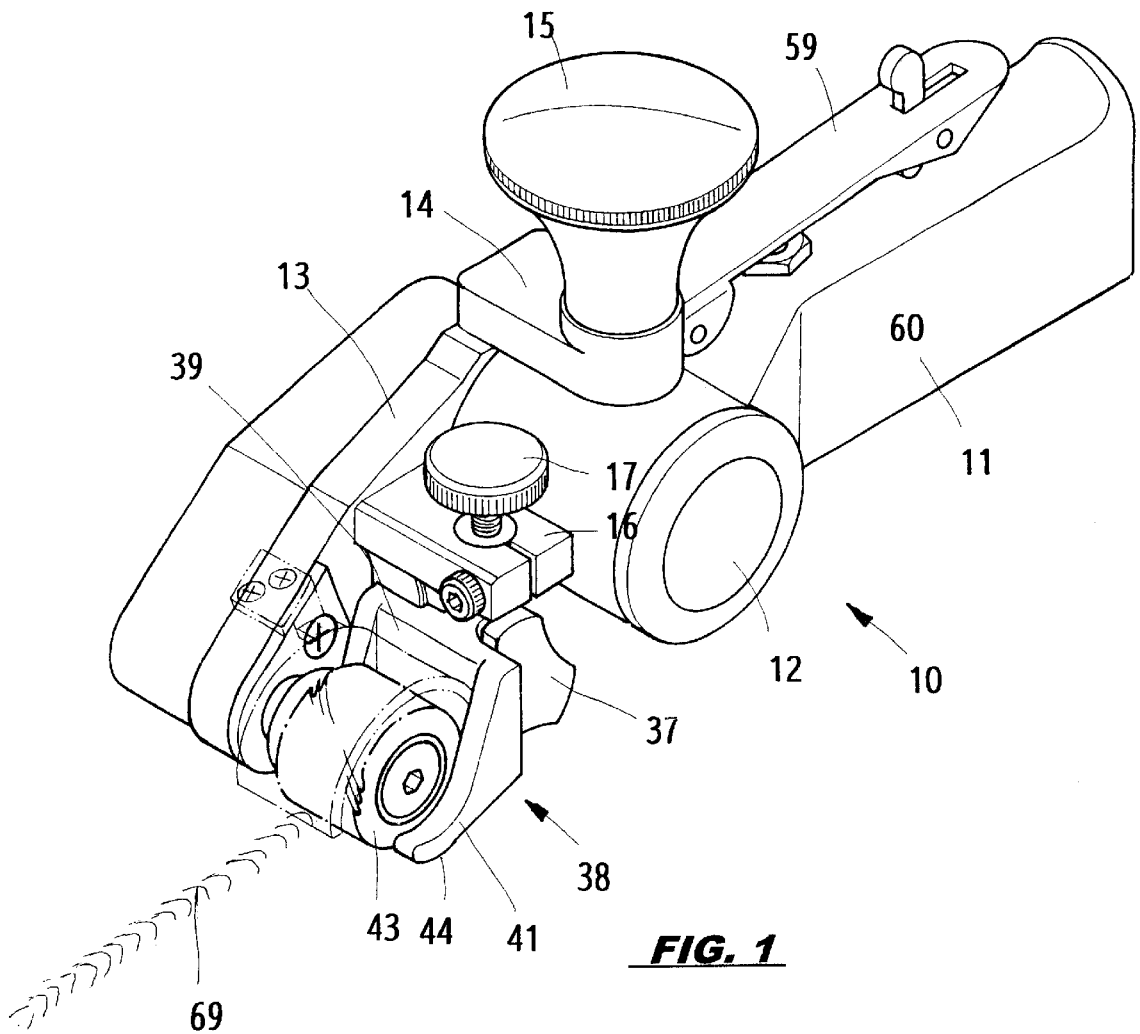
FIG. 1 is a perspective view of the present invention.
Figure 2:
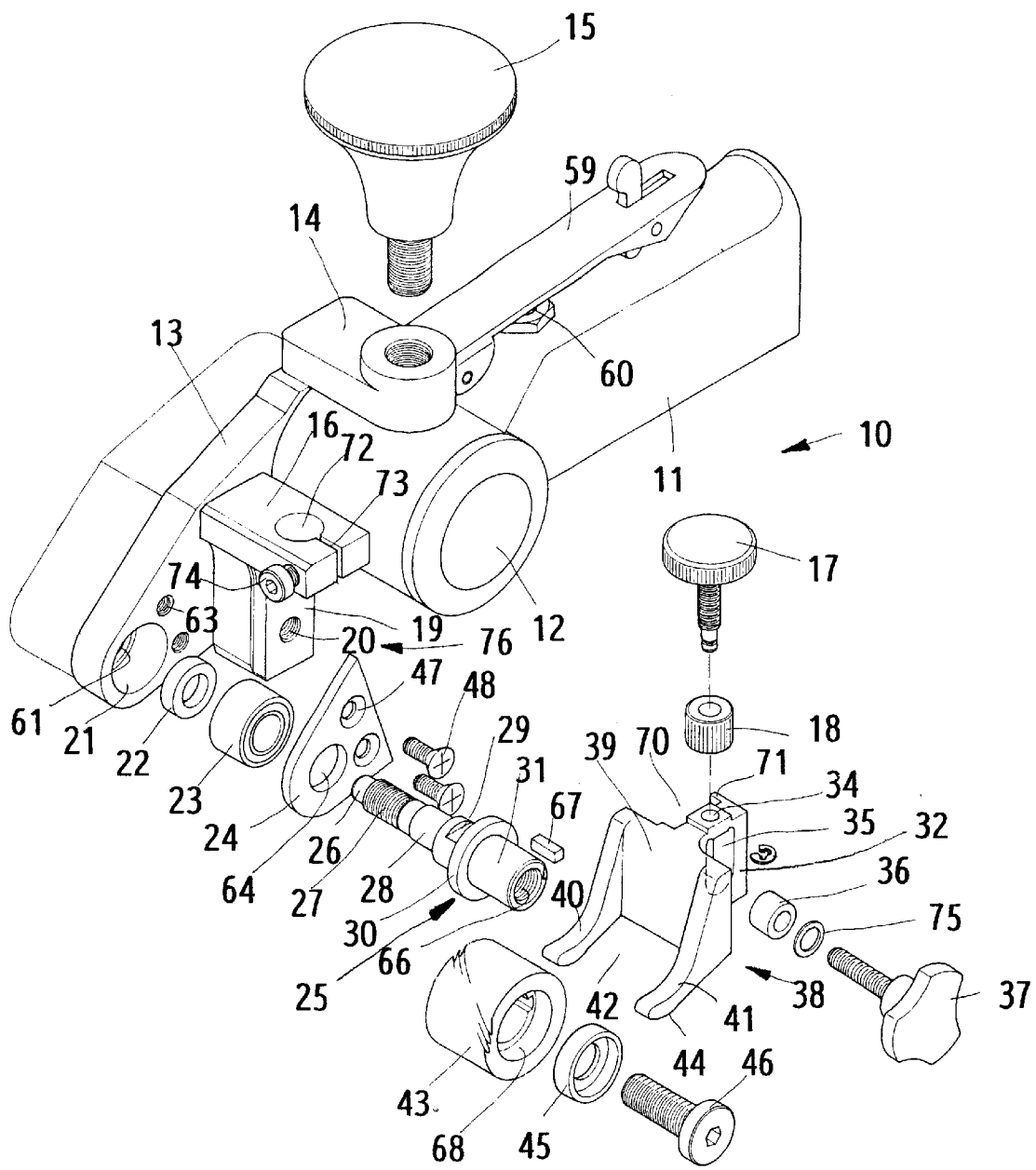
FIG. 2 is a disassembled view of the present invention, showing the relation among the parts thereof.
Figure 3:
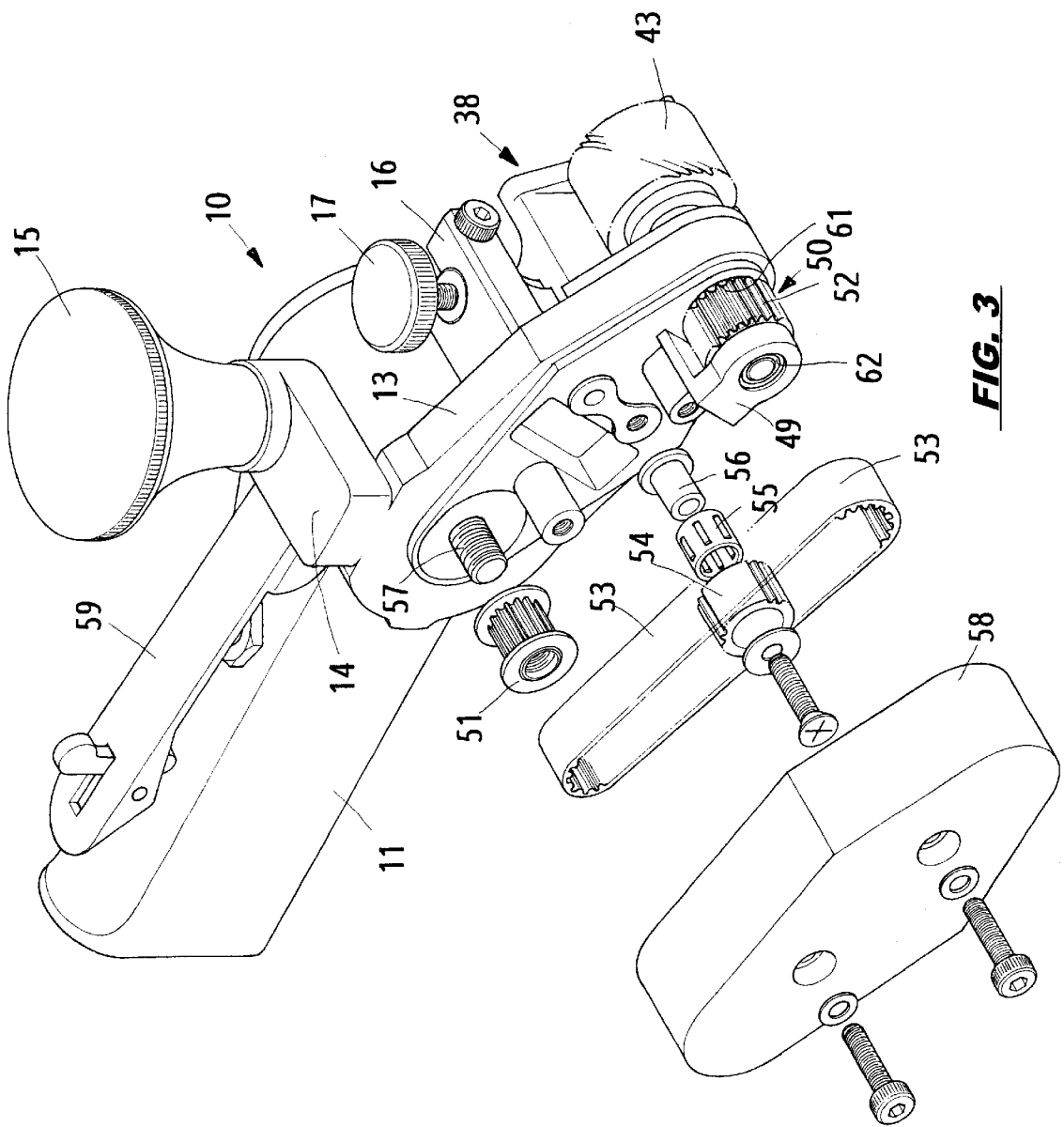
FIG. 3 is a disassembled view of the present invention, showing the structure of the transmission assemblies.
Figure 4:
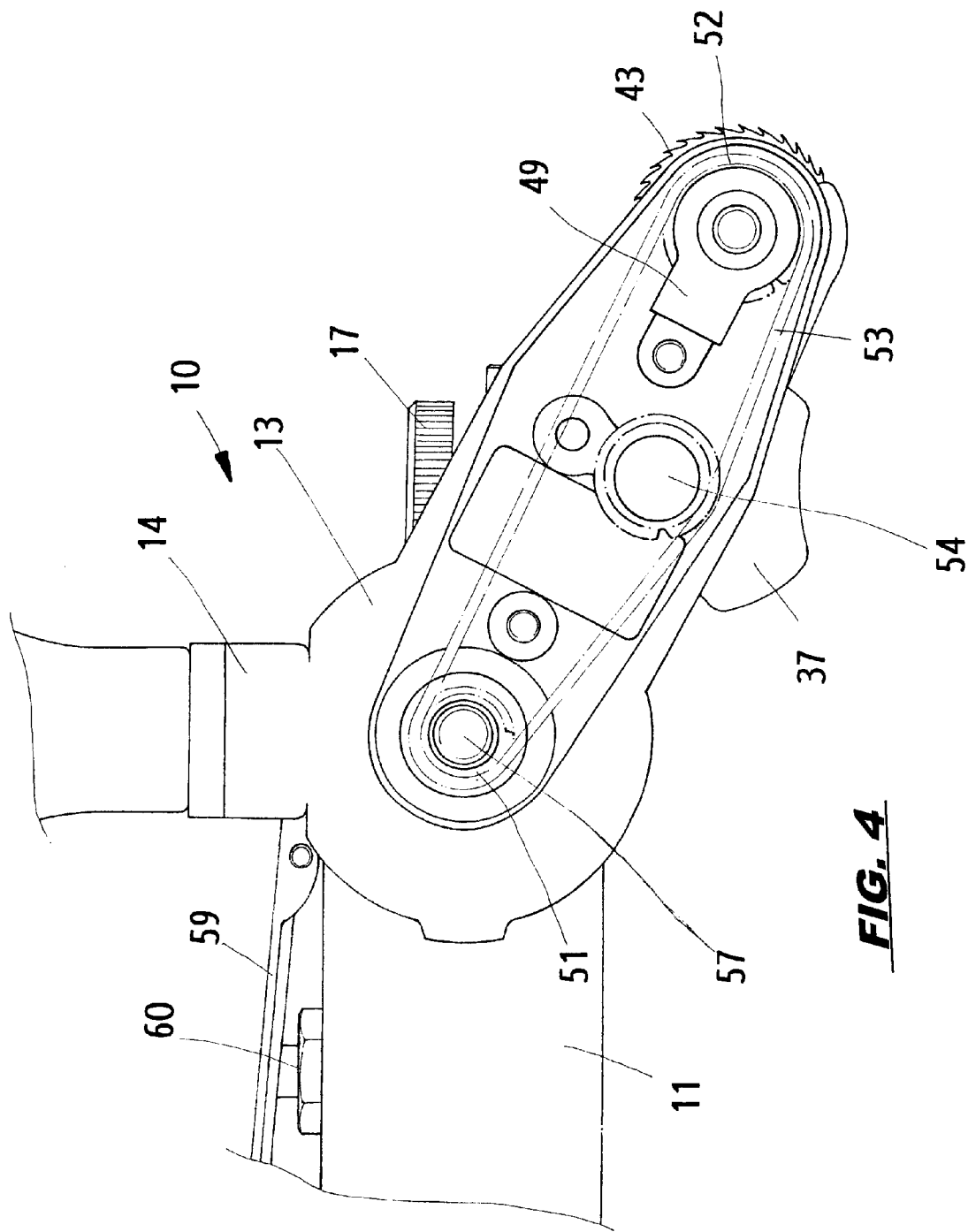
FIG. 4 is a plan view of the present invention, showing the relation among the transmission assemblies.
Figure 5:
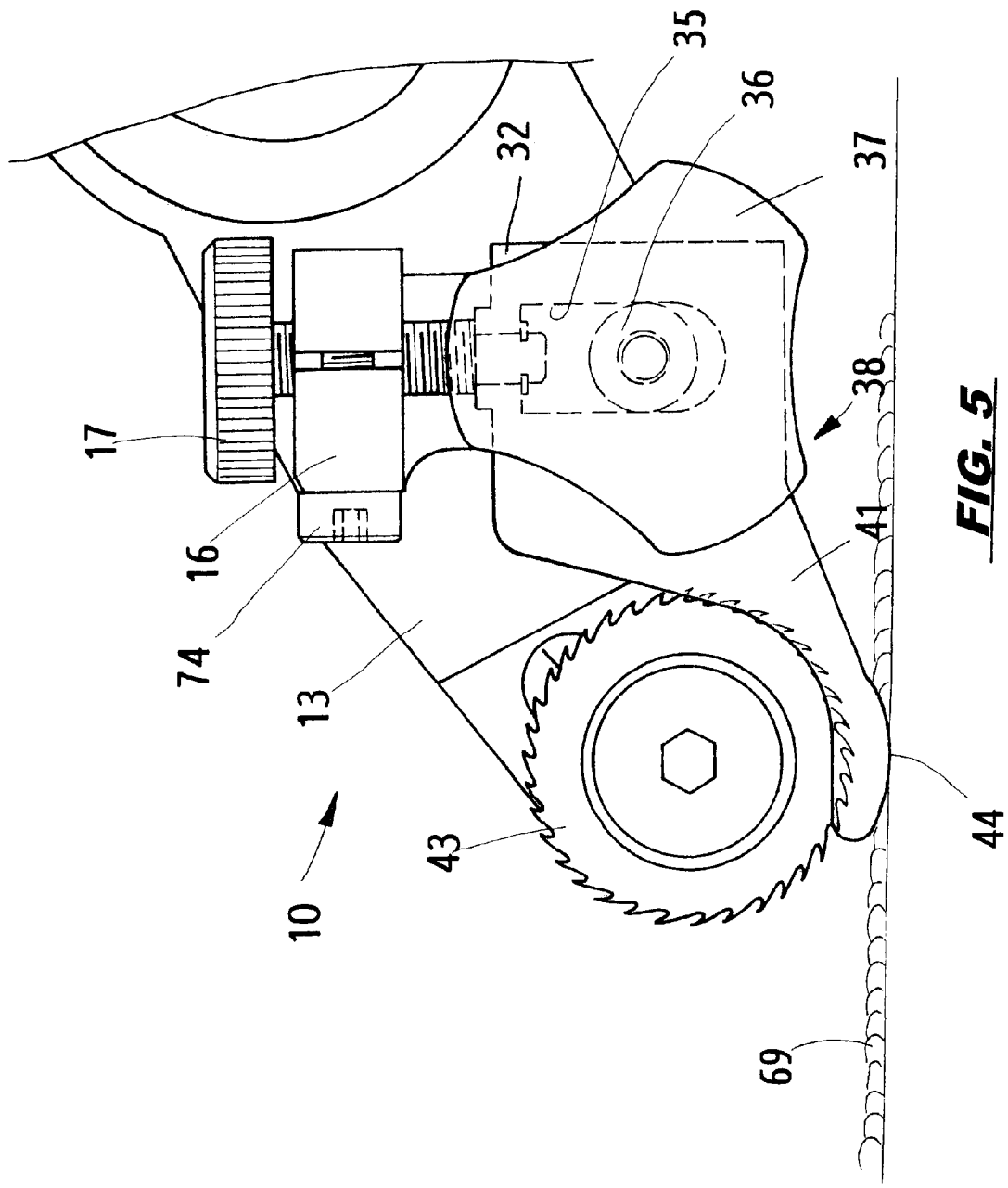
FIG. 5 is a plan view of the present invention, showing the contact condition between the guide frame and the weld beads on a plate.
Figure 6:
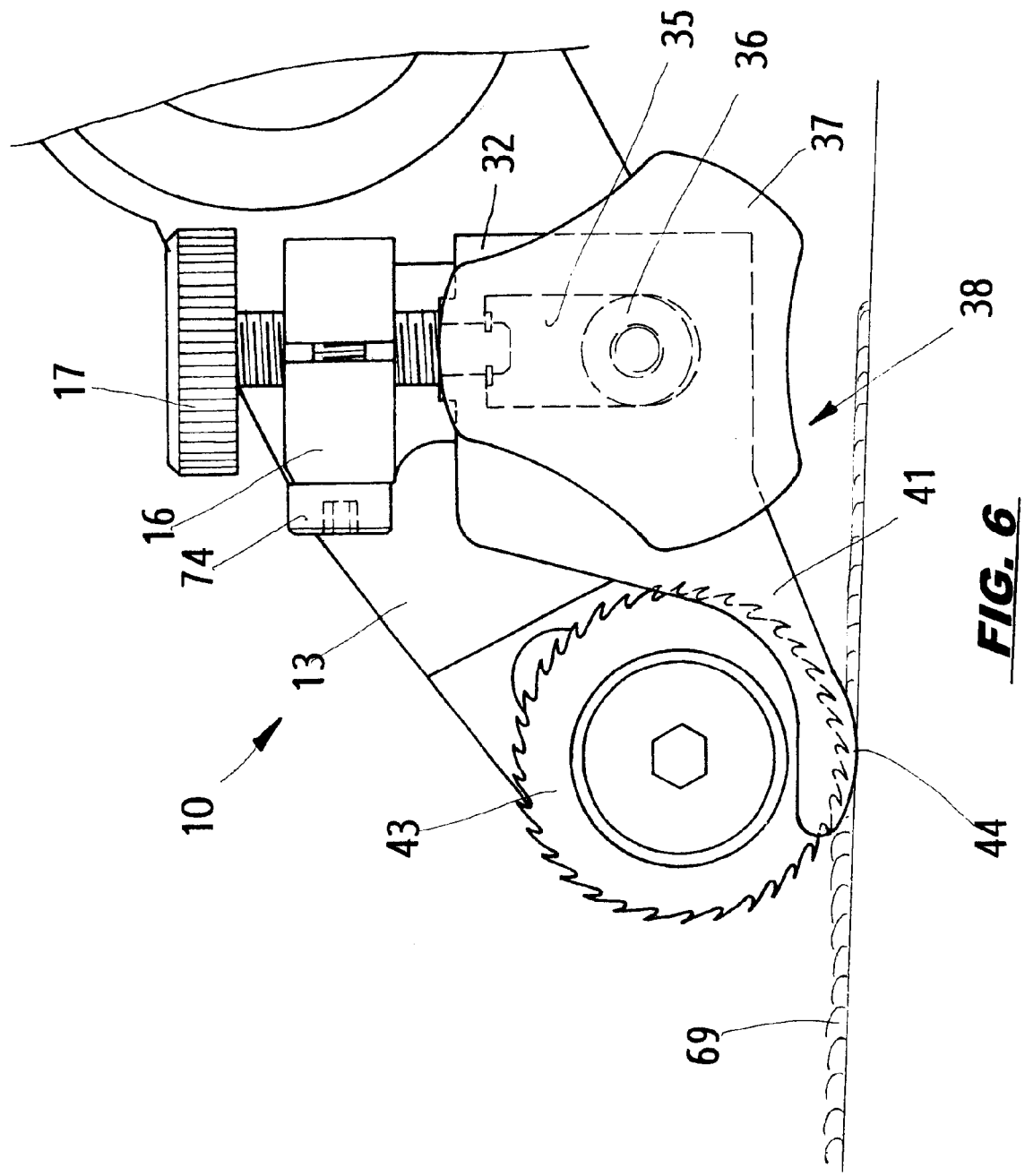
FIG. 6 is a plan view of the present invention, showing the weld beads being cut off.
Figure 7:
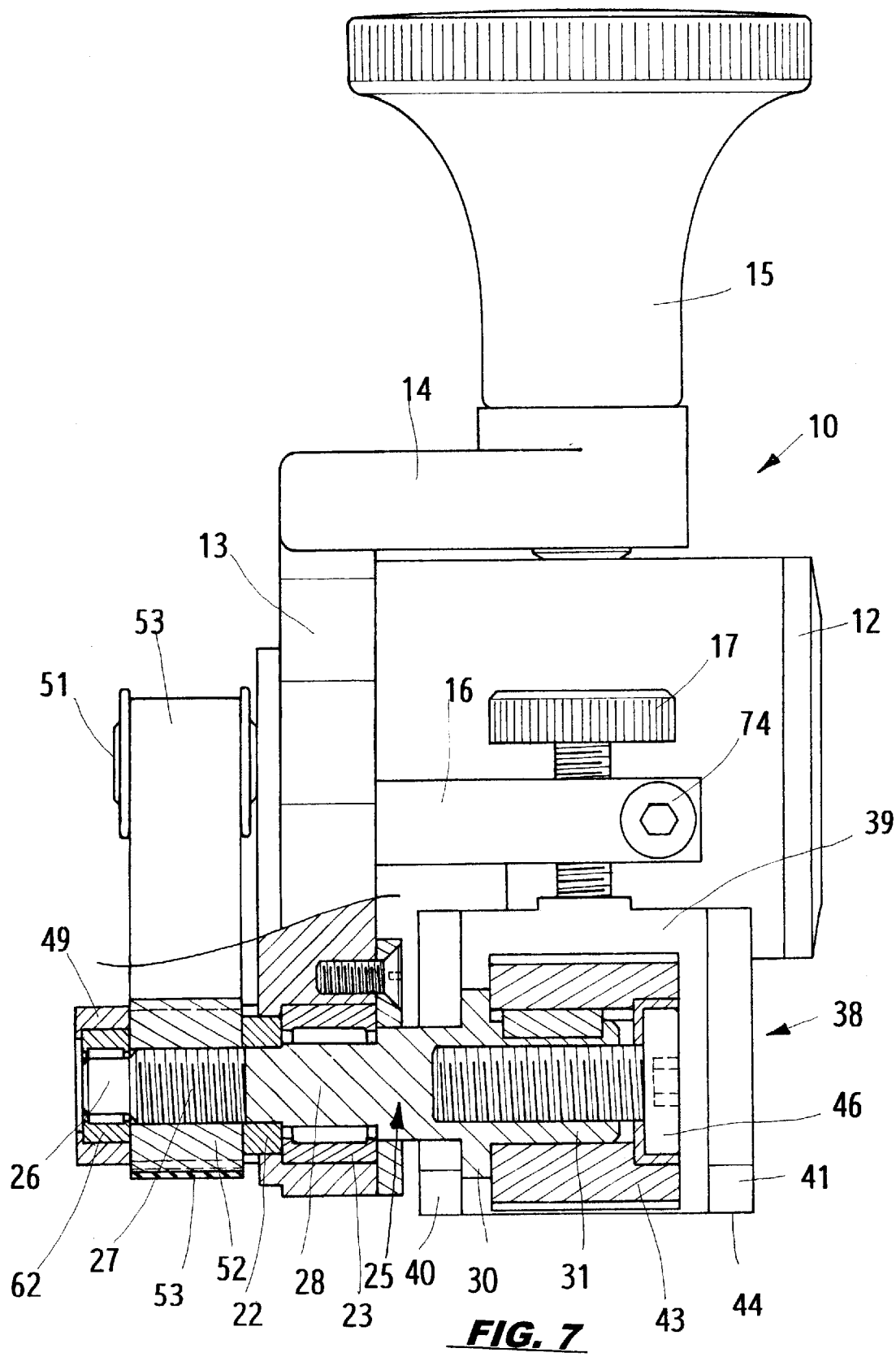
FIG. 7 is a sectional view of the present invention, showing the relation between the transmission shaft and the assemblies.

This invention relates to a cutting-off device for weld beads on car sheet-metal working; as shown in FIGS. 1, 3 and 4, the plane tool 10 of the present invention has a handle 11, which includes a trigger 59 and a switching valve 60 for controlling the intake volume of a pressure air. The front end of the handle 11 is connected with a cylinder cover 12, in which a pneumatic motor is mounted, and the outer end of a main shaft of the pneumatic motor is mounted with a gear 51 which is coupled with a gear 52, via a belt 53 with teeth, on a transmission shaft 25 so as to actuate a round milling cutter 43 mounted on the transmission shaft 25. The inner side of the round milling cutter 43 is furnished with a guide frame 38, of which the frame body 39 has two symmetrical claws 40 of both sides thereof. The bottom surface 44 of the claws 40 can be put flatly on a welded plate surface, and moved along a line of weld beads. When the round milling cutter 43 mounted between the two claws 40 is moving along the weld beads 69, the weld beads 69 will be planed off.

As shown in FIGS. 1, 2, 5 to 7, one side of the round milling cutter 43 and the guide frame 38 is furnished with a support frame 13, which is pivotally connected with the cylinder cover 12 so as to provide an adjustment angle between the support frame 13 and the handle 11. One side of the support frame 13 has a transmission shaft 57 extended from one end of the cylinder cover 12; the transmission shaft 57 and a gear 51 are connected together as one piece; the gear 51 is mounted with a belt 53 having teeth. The front end of the support frame 13 has a through round hole 61; the outer side of the support frame 13 is mounted with a support frame 49, which is mounted with a bearing block 62 for receiving a bearing 65. A groove 50 is furnished between the bearing block 62 of the support frame 49 and the round hole 61 of the support frame 13 so as to mount a gear 52 therein. The center screw hole of the gear 52 is engaged and connected with the threaded portion 27 of the transmission shaft 25. Both ends of the gear 52 are mounted with bearings 23 and 65 respectively; the gear 52 is mounted with a belt 53 having teeth; an idle gear 54 is furnished between the two gears 51 and 52; when the pneumatic motor in the cylinder cover 12 rotates, the transmission shaft 25 will be driven, via the belt 53 having teeth, to rotate so as to drive the round milling cutter 43 on the transmission shaft 25 to rotate. The front end of the support frame 13 is furnished with a bearing block 21 and a round hole 61; one side of the support frame 13 is furnished with a support frame 49 having a bearing block 62, which is aligned with the co-center line of the round hole 61 and the bearing block 21. Beside the bearing block 21 of the support frame 13, there are two symmetrical screw holes 63. A fastening plate 24 furnished with sunk spots 47 and a round hole 64 is to be attached to the surface of the bearing block 21; the sunk spots 47 of the fastening plate 24 are used for receiving screws 48 respectively, which are then fastened into the screw holes 63 in the support frame 13 so as to prevent the bearing 23 in the bearing block 21 from separation. The transmission shaft 25 pivotally mounted on the front end of the support frame 13 is mounted with a short shaft 26, a threaded portion 27, a round shaft 28, two symmetrical flat surfaces 29, a position ring 30 and a shaft 31 in regular sequence. Before the transmission shaft 25 is mounted to the front end of the support frame 13, the bearing block 62 of the support frame 49 should be mounted with a bearing 65; the front end of the support frame 13 has a bearing 21 and a round hole 61, which are mounted with a bearing 23 and a washer 22 respectively; then, the fastening plate 24 is attached to the side surface of the bearing block 21; finally, the fastening plate 24 is fastened to the side surface of the support frame 13 by means of screws 48 so as to prevent the bearing 23 from separation. The short shaft 26 and the threaded portion 27 of the transmission shaft 25 first pass through the center hole of the bearing 23 and the center hole of the washer 22 of the round hole 61 on the bearing block 21 of the support frame 13; a gear 52 is mounted in a groove 50 between the support frame 13 and the support frame 49; the short shaft 26 is mounted into the screw hole of the gear 52, and then the threaded portion 27 of the transmission shaft 25 is connected with the screw hole of the gear 52. The transmission shaft 25 can be plugged into the gear 52 by using a wrench to hold the symmetrical flat surfaces 29; then, the gear 52 and the transmission shaft 25 are screwed together as one piece. The bearings 23 and 65 on both sides of the gear 52 are fastened to the bearing blocks 21 and 62 of the support frames 13 and 49 respectively so as to provide the transmission shaft 25 with steady support.

The other end of the transmission shaft 25 is furnished with a positioning ring 30 and a shaft 31; the shaft 31 is furnished with a key seat; the end center thereof is furnished with a screw hole 66. The shaft 31 is to be engaged with a round hole of a round milling cutter 43; one end of the round hole is in contact with the positioning ring 30 of the transmission shaft 25, while the other end thereof has a large-diameter sunk hole 68; one end of the shaft 31 is mounted in the sunk hole 68. The shaft 31 and the round milling cutter 43 are fastened together by means of a key 67; then, the round milling cutter 43 is mounted to the shaft 31, of which the end has a screw hole 66. A shaft sleeve 45 is mounted into the sunk hole 68; a screw 46 passes through the center hole of the shaft sleeve 45, and then screws into a screw hole 66 so as to fasten the round milling cutter 43 to the end of the transmission shaft 25 without separation unintentionally.

The shaft 31 of the transmission shaft 25 can be mounted with a round milling cutter 43, or a grinding wheel, or a polishing wheel so as to remove, to grind and to polish the weld beads; in other words, one single tool can be used for removing the weld beads on a car body.

One end of the transmission shaft 25 is mounted between two bearing blocks 21 and 62 of the two support frames 13 and 49; the gear 52 is driven to rotate with a belt 53 having teeth. The motive force of the gear 52 is transmitted to the round milling cutter 43 through the transmission shaft 25 for planing the weld beads off.

The weld beads left on the sheet metal have a considerable hardness, and they appear in an intermittent condition. During cutting the weld beads 69, the round milling cutter 43 will contact with the weld beads 69 in an intermittent manner, and such contact has a considerable instant contact force. In order to prevent the round milling cutter 43 from being damaged during repeated cutting operation, the height of the round milling cutter 43 must be well adjusted and controlled according to the height of the weld beads for each cutting operation by means of a guide frame 38 mounted behind the round milling cutter 43.

The front end of the guide frame 38 is furnished with two claws 40 and 41 on both sides of the frame body 39 respectively; the bottom surface 44 of the two claws 40 and 41 is a curved bottom to be in contact with the sheet metal surface on both sides of the weld beads so as to prevent the round milling cutter 43 from direct contact with the sheet metal. A guide block 32 is furnished behind the center of the body frame 39 of the guide frame 38; the guide frame 38 has a guide groove 70 on one side facing the support frame 13; the center of the guide block 32 has a limit groove 35. The top of the guide block 32 has a round hole 34; the guide groove 70 of the guide block 32 is attached to a guide plate 19 of an adjusting frame 76 on one side of the support frame 13, and the flat plates 71 of both sides thereof are attached to both sides of the guide plate 19 so as to provide a positioning and guide function upon the guide frame 38 moving up or down.

The center of the guide plate 19 of the adjusting frame 76 on the support frame 13 has a threaded hole 20; the guide plate 19 is used for mounting the guide groove 70 of the guide frame 38. The flat plates 71 on both sides thereof can prevent the guide frame 38 from moving left and right. The guide groove 70 of the guide block 32 is attached to the guide plate 19; the limit groove 35 and the threaded hole 20 are in communication each other; a guide sleeve 36 is mounted in the limit groove 35; the guide sleeve 36 has a round hole for receiving an adjusting knob 37 with a washer 75; the adjusting knob 37 is finally fastened into the threaded hole 20 of the guide plate 19 so as to fasten the guide frame 38 to the guide plate 19 firmly. After the guide groove 70 can limit the guide block 32 to move, the height-adjusting knob 17 can be used to adjust the guide frame 38 to move up and down.

The height-adjusting knob 17 on the guide plate 19 is mounted into a thread sleeve 18, which is mounted in a cylindrical hole 72 of a clamp plate 16 above the guide plate 19 of the support frame 13 so as to adjust the height upon turning the height-adjusting knob 17; one side of the cylindrical hole 72 has a slot 73; one side of the slot 73 has a screw hole perpendicular to the slot 73 for receiving a screw 74; the screw 74 can be screwed tightly to have the thread sleeve 18 clamped in the cylindrical hole 72 of the clamp plate 16 for controlling the thread sleeve 18 to move or rotate.

The lower end of the height-adjusting knob 17 is substantially a round bar, of which the diameter is designed to fit the round hole 34 of the guide block 32; the round lower end of the height-adjusting knob 17 extends through the round hole 34 of the guide block 32 and into the limit groove 35; then, an E-retaining ring is mounted thereto so as to use the height-adjusting knob to adjust the guide frame 38 to move up and down.

A pressure plate 14 is furnished above the cylinder cover 12; the outer end of the pressure plate 14 has a screw hole for receiving a press knob 15 to facilitate a user's hand to hold upon exerting pressure and directing moving direction during operation.

During planing operation, the guide frame 38 can be lowered by adjusting the height-adjusting knob 17 so as to adjust the space between the bottom surface 44 of the two claws 40 and 41 of the guide frame 38 and the round milling cutter 43 to be slightly smaller than the height of the weld beads 69. Before turning the height-adjusting knob 17, the adjusting knob 37 under the clamp plate 16 should be loosened first so as to have the guide block 32 of the guide frame 38 and the guide plate 19 released, and to adjust the height-adjusting knob 17. After the height-adjusting knob 17 is regulated to a height desired, tighten the adjusting knob 37; the adjusting knob 37 will exert a pressure to the washer 75 so as to have the guide block 32 pressed to the guide plate 19 tightly, and to limit and prevent the height-adjusting knob 17 from rotating again; then, the guide frame 38 will be fastened to the guide frame 19 firmly.

During planing weld beads 69, let the channel 42 between the two claws 40 and 41 of the guide frame 38 move close to the weld beads 69, and press the trigger 59; then, turn on the switch value 60 to start the pneumatic motor in the cylinder cover 12 so as to drive the gear 51 to rotate; through the transmission of the belt 53 and the gear 52, the power will be transmitted to the round milling cutter 43 mounted on one end of the transmission shaft 25. As soon as the bottom surface 44 of the two claws 40 and 41 of the guide frame 38 touches the sheet metal, the round milling cutter 43 will start the first planing operation.

Hold the press knob 15 with hand to control the guide frame 38 of the plane tool to apply pressure and to move; the channel 42 between the two claws 40 and 41 of the guide frame 38 will move along the line of weld beads 69. When the bottom surface 44 of the two claws 40 and 41 moves along both sides of the weld beads 69, the space between the round milling cutter 43 and the weld beads 69 is limited. When the round milling cutter 43 turns quickly and contacts the weld beads 69, it can cut a portion of the weld beads 69 as a result of the press knob 15 being pressed; in that case, the reaction force of the planing operation is small without affecting the planing operation. When the plane tool moves along the line of weld beads 69, the space between the bottom surface 44 of the claws 40 and 41 can be adjusted gradually so as to plane off all the weld beads 69.

The round milling cutter 43 on the shaft 31 of the transmission shaft 25 can be removed by using a wrench to remove the screw 46 and the shaft sleeve 45 first, and then is replaced with a grinding wheel or a polishing wheel so as to remove the weld beads completely without any scar left.

The plane tool 10 of the present invention not only can be used for planing off the weld beads 69, but also can be used for planing off rivet beads of car sheet metal.

According to the aforesaid description of the embodiment of the present invention, the features and structure of the present invention have been disclosed completely; it is apparent that the present invention has provided obvious improvement, which is never anticipated and achieved by any person in the field; therefore, the structure thereof is deemed unique.

What is claimed is:

1. A planing device for removing weld beads on car sheet metal comprising:
   a) a power device including a power source, a handle, and a support frame extending therefrom, the support frame having a distal end;
   b) a first gear driven by the power source and extending from a first side of the support frame;
   c) a transmission shaft rotatably mounted in the distal end of the support frame by a bearing so as to extend outwardly from the first side of the support frame and an opposite, second side of the support frame;
   d) a second gear mounted on the transmission shaft extending from the first side of the support frame;
   e) an endless drive belt engaging the first and second gears such that rotation of the first gear by the power source causes rotation of the second gear and the transmission shaft;
   f) a cutting tool mounted on the transmission shaft extending from the second side of the support frame so as to rotate with the transmission shaft; and,
   g) a cutting depth adjusting mechanism including:
      i) a clamp plate and a guide plate extending from the second side of the support plate;
      ii) a height adjusting knob threadingly engaging the clamp plate; and,
      iii) a frame body connected to the height adjusting knob and slidably attached to the guide plate, the frame body including two claws, one on each opposite side of the cutting tool, each configured to contact the sheet metal, whereby rotation of the height adjusting knob adjusts the height of the frame body relative to the support frame to thereby adjust a cutting depth of the cutting tool.

2. The planing device of claim 1 further comprising a support frame mounted on the first side of the support frame and supporting an end of the transmission shaft by a bearing.

3. The planing device of claim 2 wherein the second gear is located between the support frame and the support plate.

4. The planing device of claim 1 further comprising:
   a) a slot in the frame body; and,
   b) an adjusting knob passing through the slot and threadingly engaging the guide plate.

5. The planing device of claim 1 wherein bottom surfaces of the two claws are curved.

6. The planing device of claim 1 wherein the power source comprises a pneumatic motor.

7. The planing device of claim 1 further comprising:
   a) a pressure plate on the power device; and,
   b) a press knob mounted on the pressure plate.

8. The planing device of claim 1 wherein the endless drive belt is a toothed drive belt.

9. The planing device of claim 1 further comprising an idle gear extending from the first side of the support plate and engaging the drive belt.

* * * * *